United States Patent
Bleve et al.

(10) Patent No.: US 12,449,972 B2
(45) Date of Patent: Oct. 21, 2025

(54) INTELLIGENT DEVICE EXTENSION FOR BUILDING SOFTWARE APPLICATIONS

(71) Applicant: Siemens Aktiengesellschaft, Munich (DE)

(72) Inventors: Francesco Bleve, Milltown, NJ (US); Holger Strobel, Steinbach (DE); Szófia Fazekas-Zisch, Öhningen (DE)

(73) Assignee: Siemens Aktiengesellschaft, Munich (DE)

( * ) Notice: Subject to any disclaimer, the term of this patent is extended or adjusted under 35 U.S.C. 154(b) by 172 days.

(21) Appl. No.: 18/554,661

(22) PCT Filed: May 18, 2021

(86) PCT No.: PCT/US2021/032851
§ 371 (c)(1),
(2) Date: Oct. 10, 2023

(87) PCT Pub. No.: WO2022/245334
PCT Pub. Date: Nov. 24, 2022

(65) Prior Publication Data
US 2025/0085928 A1 Mar. 13, 2025

(51) Int. Cl.
G06F 3/06 (2006.01)
G06F 8/30 (2018.01)
G06F 11/14 (2006.01)

(52) U.S. Cl.
CPC .......... *G06F 3/0607* (2013.01); *G06F 3/0665* (2013.01); *G06F 8/30* (2013.01);
(Continued)

(58) Field of Classification Search
CPC .. G06F 11/1451; G06F 3/0637; G06F 3/0631; G06F 3/0644; G06F 3/0607; G06F 3/0665
See application file for complete search history.

(56) References Cited

U.S. PATENT DOCUMENTS 7,325,111 B1 * 1/2008 Jiang .................... G06F 11/1451
711/111
2005/0066076 A1 3/2005 Best et al.
(Continued)

FOREIGN PATENT DOCUMENTS

WO 2017096521 A1 6/2017

*Primary Examiner* — Tuan A Vu

(57) ABSTRACT

A computer-implemented method for building an application image on a target device of an industrial automation system is disclosed. The target device includes an internal storage medium organized into one or more logical volumes. The method includes identifying an external storage device connected to the target device. The method further includes extending a logical volume of the target device through integration between the internal storage medium and the external storage device. The method further includes initiating a build process for building the application image, wherein the extended logical volume is utilized by the build process. The build process necessitates more space than that used by a final artifact resulting from the build process. The method further includes, subsequent to the completion of the build process, shrinking the extended logical volume to its original state prior to the extension, enabling release of the external storage device from the target device.

20 Claims, 5 Drawing Sheets

(52) U.S. Cl.
CPC .......... *G06F 3/0631* (2013.01); *G06F 3/0637* (2013.01); *G06F 3/0644* (2013.01); *G06F 11/1451* (2013.01)

(56) References Cited

U.S. PATENT DOCUMENTS

| | | | |
|---|---|---|---|
| 2008/0034226 A1* | 2/2008 | Maruyama | G06F 3/0637 713/193 |
| 2010/0250886 A1* | 9/2010 | Eguchi | G06F 3/0631 711/170 |
| 2011/0307680 A1* | 12/2011 | Yamamoto | G06F 3/0644 711/E12.002 |
| 2014/0109086 A1 | 4/2014 | Mizrahi et al. | |
| 2019/0278631 A1 | 9/2019 | Guim Bernat et al. | |
| 2020/0103864 A1 | 4/2020 | Stump et al. | |

* cited by examiner

INTELLIGENT DEVICE EXTENSION FOR BUILDING SOFTWARE APPLICATIONS

TECHNICAL FIELD

The present disclosure relates, in general, to industrial automation, and in particular, to a technique for building software applications directly on a target device of an industrial automation system by expanding the capacity of the target device.

BACKGROUND

In the industrial automation industry, complex systems like Supervisory Control and Data Acquisition (SCADA) are commonly deployed to supervise and support an industrial or manufacturing process that involves multiple levels of various control systems consisting of devices such as multi-purpose programmable logic controllers (PLCs), embedded Edge devices, headless gateways, Human Machine Interface (HMI) panels, industrial personal computers (PCs), on-premises servers, and cloud infrastructure devices.

Conventionally, software applications for certain industrial automation devices (e.g., panel/Edge devices) are built on backend servers (e.g., on-premises servers and cloud-based servers) where resources such as CPU, disk space, etc. are plentiful. Once built, the resulting application image layers are deployed to the target device where the application is then executed.

However, certain use-cases may require applications to be built directly on the target device. Examples of such use-cases include: backend server(s) temporarily offline or not reachable; lack of separate backend server(s); a solution offering multiple building environments (e.g. on backend server, on the Edge device, etc.). Even though both the backend server and target device may be capable of building applications, the main differentiator is the availability of resources, which, on many industrial automation devices, are scarce.

SUMMARY

Briefly, aspects of the present disclosure relate to a technique for building an application image directly on a target computing device of an industrial automation system by expanding the capacity of the target computing device.

A first aspect of the disclosure provides a computer-implemented method for building an application image on a target device of an industrial automation system. The target device comprises an internal storage medium organized into one or more logical volumes. The method comprises identifying an external storage device connected to the target device. The method further comprises extending a first logical volume of the one or more logical volumes through integration between the internal storage medium and the external storage device, so as to define an extended logical volume. The method further comprises initiating a build process for building the application image, wherein the extended logical volume is utilized by the build process. The build process necessitates more space than that used by a final artifact resulting from the build process, the final artifact defining the application image. The method further comprises, subsequent to the completion of the build process, shrinking the extended logical volume to the first logical volume, enabling release of the external storage device from the target device.

A second aspect of the disclosure provides a computing device of an industrial automation system. The computing device comprises a processor and a memory comprising an internal storage medium. The internal storage medium is organized into one or more logical volumes. The memory has stored thereon a software component to expand a capacity of the computing device to build an application image thereon, the software component, when executed by the processor, configures the computing device to execute the above-described method.

Additional technical features and benefits may be realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The foregoing and other aspects of the present disclosure are best understood from the following detailed description when read in connection with the accompanying drawings. To easily identify the discussion of any element or act, the most significant digit or digits in a reference number refer to the figure number in which the element or act is first introduced.

DETAILED DESCRIPTION

Figure 1:
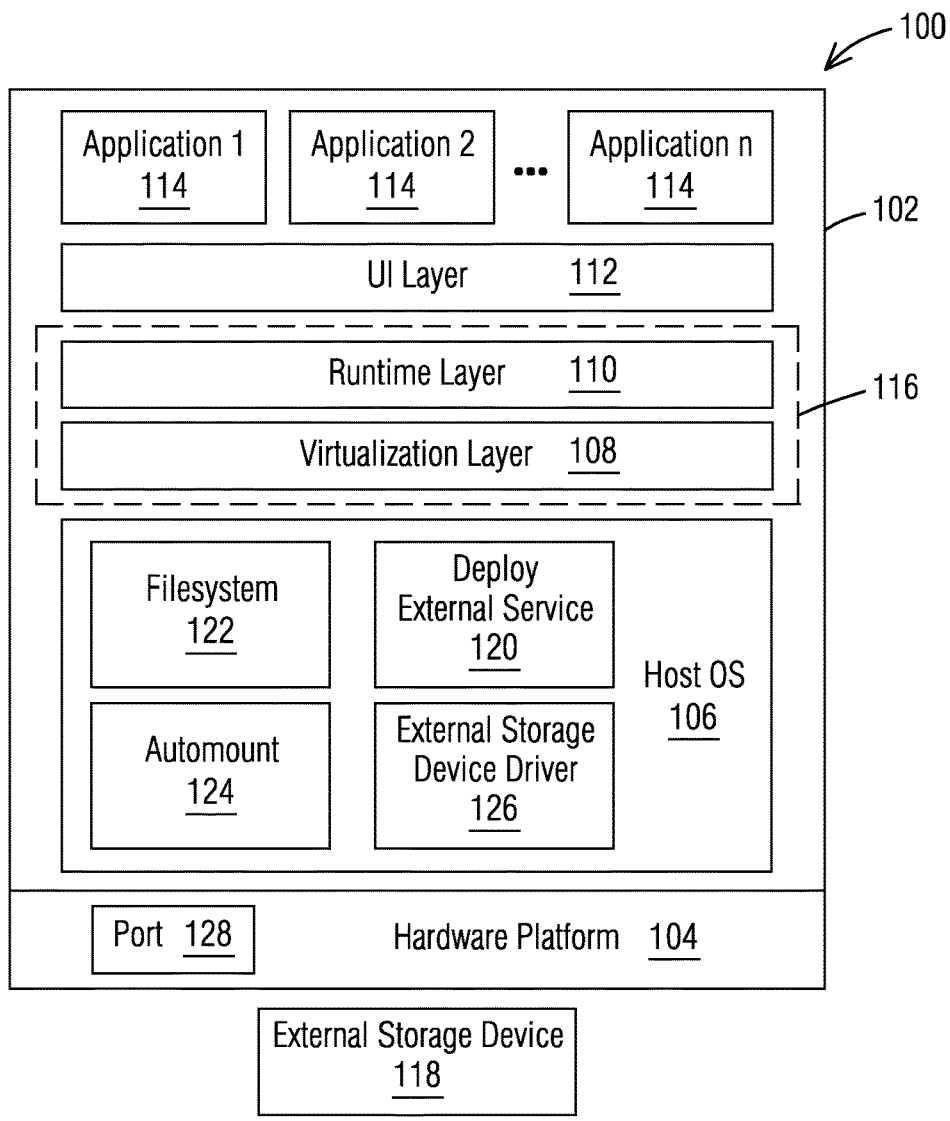
FIG. 1 is a schematic diagram showing an example of an industrial automation according to an aspect of the present disclosure.

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

The advent of Edge Computing and Industry 4.0 has transformed standard industrial automation devices (e.g. HMI/SCADA) into more intelligent machines, rendering them capable of extracting real-time insights from the data for performing tasks like predictive maintenance, condition-based monitoring, complex-event processing, Edge-based control, etc. In today's parlance, "Edge computing" refers to a computing paradigm where computing is carried out outside the cloud, at the edge of a network, typically in applications where real-time processing of data is needed, to improve response time and/or save bandwidth. An "Edge device" refers to a device in which Edge computing is enabled. An "Edge application" refers to a software application module executable in an Edge computing environment.

To enable Edge computing, many industrial automation devices are enhanced through the introduction of a software layer known as Edge runtime. The Edge runtime is at the core of an Edge platform and comprises tools for executing and building Edge applications. A commonly used type of Edge runtime is a container-based Edge runtime, although several other types of Edge runtimes exist in today's Edge landscape.

Even if an Edge device is capable of building an application to be executed by it, resources, particularly disk space, pose a significant challenge considering that: (1) once built, Edge applications can be large, typically several gigabytes, and (2) disk space required for the build process can be considerably larger than the size of the resulting application image layers. While, for deployment, an Edge device is required to have at least enough disk space to host the deployed application to satisfy requirement (1), a substantial challenge exists when building an application locally on the Edge device to satisfy requirement (2).

Embodiments of the present disclosure address at least some of the technical challenges described above.

FIG. 1 schematically illustrates one example of an industrial automation device 100 according to an aspect of the present disclosure. The device 100 is a computing device having a processor and a memory comprising a computer readable storage medium. For example, the device 100 may be a supervisory device for supervisory and control support in an industrial automation system, such as an HMI panel. In the described embodiment, the device 100 is an Edge device. The device 100 is generally referred to in the description as a "target device". A "target device" refers to a device where an instance of the application image being built is to be executed. In the disclosed embodiments, the application image is built directly on the target device 100.

The target device 100 comprises a software stack 102 deployed on a hardware platform 104. The hardware platform 104 comprises the processor architecture (e.g., CPU, GPU, FPGA, etc.) and the memory that includes an internal storage medium (such as an internal flash drive). The software stack 102 resides in the internal storage medium. The software stack 102 may include a host operating system 106, a virtualization layer 108, a runtime layer 110, a user-interface (UI) layer 112 and one or more application modules 114.

The virtualization layer 108 includes a collection of software components that enable the application modules 114 to run on virtual hardware (e.g., including a hypervisor) or virtual operating systems (e.g., including a container engine). The embodiment shown in FIG. 1 is an example of the latter. Here, the virtualization layer 108 includes a container engine, such as Docker, for deploying containerized applications. The virtualization layer 108 allocates cores and memory to application modules 114 (e.g., application containers), enforces spatial isolation and security of the application modules 114, and provides scalability by enabling the addition of application modules, among other functions. In some embodiments, the virtualization layer 108 may be provided as part of the device firmware.

The runtime layer 110 is a specific application managing the virtualization layer 108 and is responsible for configuration of the virtualization layer 108, for example to implement panel virtualization. In the described embodiment, the runtime layer 110 is implemented in an Edge platform, enabling the device 100 to function as an Edge device. In one embodiment, the runtime layer 110 and the virtualization layer 108 may be bundled into an Edge core package (Edge runtime) 116 which may be deployed to the device 100. In this case, Edge runtime 116 the comprises the components (e.g., container engine) for executing and building Edge applications An application module may be built directly on the target device 100 based on application source code, which may be received, for example, from an external storage device, or via a remote connection, such as a web browser. A user may specify an "install" operation via the UI layer 112. This triggers the runtime layer 110 to call an application build process. The build process is executed by the virtualization layer 108, which includes, in this example, the container engine. At the completion of the build process by the virtualization layer 108, the final artifact comprises the application and its dependencies (libraries, configuration files etc.), and in some cases, a guest operating system, all of which are bundled in an isolated user space instance. The virtualization layer 108 typically requires significant resources (disk space) to execute the build process, for example to accommodate dependencies of sources, garbage handling, etc., while building.

It will be appreciated that although the described embodiments relate to the context of building a containerized Edge application, the general teachings of the present disclosure are neither limited to Edge computing nor to containerization technologies, and may be suitably implemented in case of other virtualization environments or other types of (non-virtualized) Edge applications. However, the described embodiments are particularly relevant in the context of building virtualized application modules where the application build process typically necessitates significantly more space than the final artifact resulting from the build process.

The term "space", unless otherwise specified, refers to memory space in a storage medium, measurable in units of information, such as gigabytes (GB).

Figure 2:
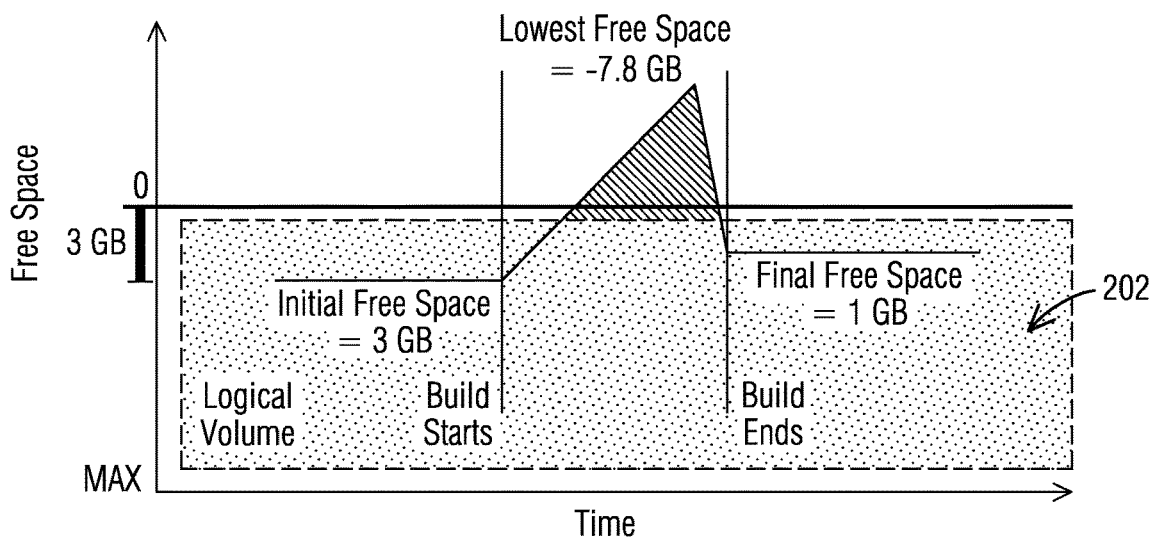
FIG. 2 is a schematic diagram illustrating space utilization as a function of time by an application build process leading to failure due to shortage of disk space in the target device.

When building a containerized application on the target device 100, if an "out of disk space" condition is reached while the build process is in progress, the build process is abruptly halted, causing the build process to fail. FIG. 2 is an illustrative example showing space utilization as a function of time by an application build process, leading to failure due to shortage of disk space in the target device 100. The internal storage medium of the target device is organized into one or more logical volumes, including a main logical volume (designated as 202) initialized by a root filesystem. In the shown example, it is desired to build an application image when there is 3 GB of space left in the main logical volume 202. The artifact resulting from the build process is approximately 2 GB, hinting that the build operation should not have any problem succeeding considering that there is at least 2 GB of free space available plus an extra 1 GB space as buffer. Unfortunately, this is not the case in the example shown in FIG. 2. Even though the final artifact only takes 2 GB of space, the build process requires up to ~11 GB of overall space available. This means that there is a shortage an extra ~8 GB space for being able to perform the build process on this target device.

In the current state-of-the-art, when an "out of disk space" condition is reached while an application build process is in progress, the user is required to reclaim disk space by deleting extra data. An example is docker <command> prune, which is a command that is used to delete dangling images, stopped containers, unused docker volumes, unused docker networks, etc. While it is usually unnecessary data that is reclaimed in the process, useful data might be also permanently deleted unintentionally. Moreover, if no unnecessary data to be deleted is available, either useful data has to be deleted, or the build process cannot be executed.

Referring again to FIG. 1, aspects of the present disclosure provide a novel technique that seamlessly expands the target device's logical volume by using an external storage device 118 as extension. Via this approach, new space is added to the target device 100, meaning that the user is not required anymore to delete existing data just for the purpose of completing a local build process. In the described embodiments, extension of the logical volume is implemented using the technique of logical volume management (LVM).

The proposed technique may be realized by an intelligent software component, labeled in FIG. 1 as Deploy External Service (DES) 120. The DES component 120 manages and executes a process of identifying the external storage device 118 when connected to the target device 100, extending a logical volume to build an application image through integration between the target device internal storage medium and the external storage device 118 and shrinking the logical volume after the build process is completed. The DES component 120 may comprise, for example, a script code, or an application, which may be integrated with a webserver. The DES component 120 may be configured to execute the process by interacting with artifacts, which include the filesystem 122 that is extendable (e.g., by LVM), automount 124 for mounting the filesystem on the external storage device 118 and external storage device driver 126 for automatically identifying the external storage device 118 when connected to the target device 110 via physical port 128.

The problem addressed by the present disclosure is of a temporary nature. Additional disk space is required in order to perform the build process, but not required anymore once the build process has been completed. It applies to those cases in which the build process necessitates more space than the final size of the artifact resulting from the build process. Existing approaches lack in providing a solution that addresses the temporary nature of the problem, but instead force the user to perform permanent changes. In the example shown in FIG. 2, by using the current state-of-the-art, the user would be forced to permanently delete ~8 GB of data from the disk in order to perform the build process. This is an unnecessary limitation since once the build process is completed, the additional free space would not be needed anymore. By using the technique proposed herein, the user would not have to delete any data and would still be able to complete the build process.

In the described embodiments, the internal storage medium of the target device is managed using LVM technology, whereby the internal storage medium is organized into one or more logical volumes. The description that follows uses terminology that is well known in the art of LVM, such as "physical volume," "virtual group," "logical volume," etc., and hence does not contain detailed explanation of these terms.

When the target device is initialized, typically during the stage of provisioning and onboarding, a physical volume $PV_1$ for the internal storage medium is created and is assigned to a virtual group VG that acts as a container for the volume. From the virtual group VG, a main logical volume LV is created and initialized with a root filesystem. This main logical volume LV will host the virtualization layer/Edge runtime, as well as any data related to the application modules, such as build data, volumes, image layers, networks, configurations, etc.

When there is not enough free space available anymore on the root filesystem, any further attempt to perform an application build process may fail. To overcome this limitation and extend the available memory of the target device, the described technique uses an LVM capable external storage device. The resulting process is illustrated referring to FIG. 3.

Figure 3:
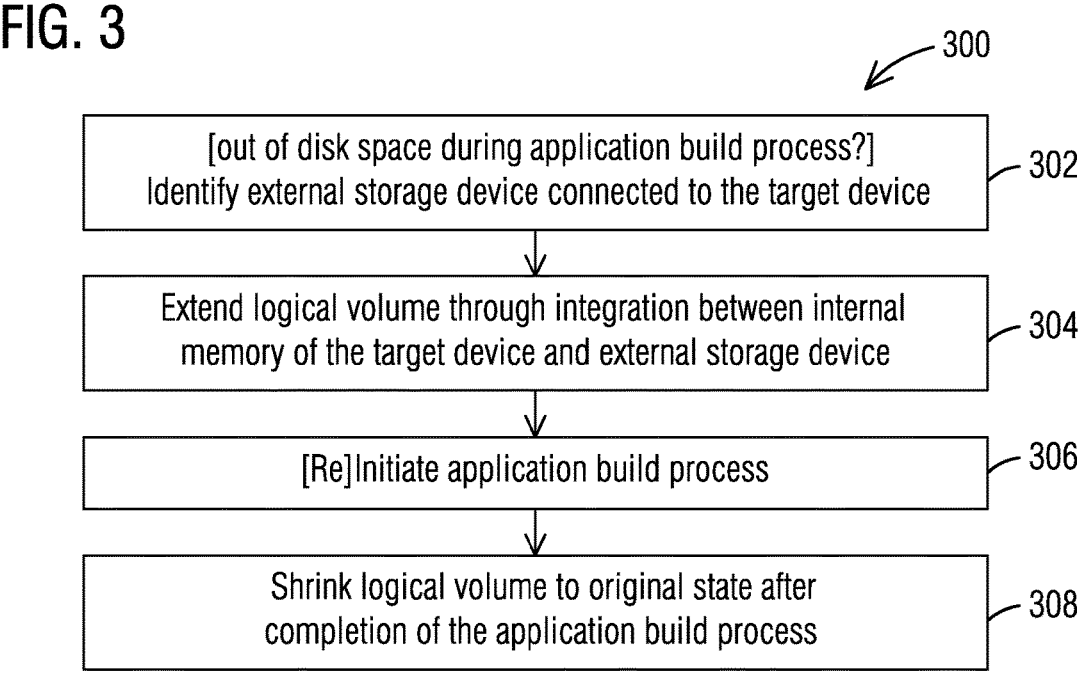
FIG. 3 is a flowchart illustrating an example embodiment of a method for intelligently expanding a capacity of the target device to build an application according to the present disclosure.

FIG. 3 is a flowchart depicting an example embodiment of a method 300 for expanding the capacity of a target device, such as an Edge device, to build an application image. The method 300 may be embodied in an intelligent software component, such as the DES component 120 in FIG. 1. The proposed software component may be stored on the memory (e.g., on the internal storage medium) of the target device and executable by the processor of the target device. FIG. 3 is not intended to indicate that the operational blocks of the method 300 are limited to what is shown in the flowchart. The method 300 can include any suitable number of additional operations. For the purpose of illustration, the method 300 will be described continuing with the example scenario shown in FIG. 2.

Operational block 302 involves identifying an external device connected to the target device. The external storage device may include, for example and without limitation, any of: an external flash drive (e.g., USB stick), an external hard disk, a secure digital (SD) card, a solid state drive, etc. The external storage device may be identified by an external storage device driver which may be managed by the proposed software component. Typically, this operation may be carried out after an "out of disk space" condition is reached during progress of a build process to build an application image on the target device. Particularly, in the described embodiment, the "out of disk space" condition is reached when there is not enough free space available in the above-described main logical volume LV of the internal storage medium of the target device. In one embodiment, at the point when the "out of disk space" condition is reached, the proposed software component may generate a prompt for the user to connect an external storage device to the target device. In another embodiment, the proposed software component may automatically detect and identify an already connected external storage device at the point when an "out of disk space" condition is reached. No user interaction is necessary in this case.

Operational block 304 involves extending a logical volume of the target device through integration between the internal storage medium and the external storage device. To execute this operation, the proposed software component may be configured to manage the device's logical filesystem and automounter. In the described embodiment, this operation involves extending the main logical volume LV, which was initialized with the root filesystem, to include a physical volume of the external storage device. Prior to extending the logical volume, the external storage device is formatted and initialized with an LVM partition. In various embodiments, the initialization of the external storage device may be performed prior to it being connected to the target device, or may be performed by the proposed software component itself after the external storage device is connected to the target device (allowing a non-initialized external storage medium to be used). In the latter case, the software component may be configured to first perform a check to determine if the external storage device is formatted or not, before mounting the filesystem on the external storage device 118.

Figure 4:
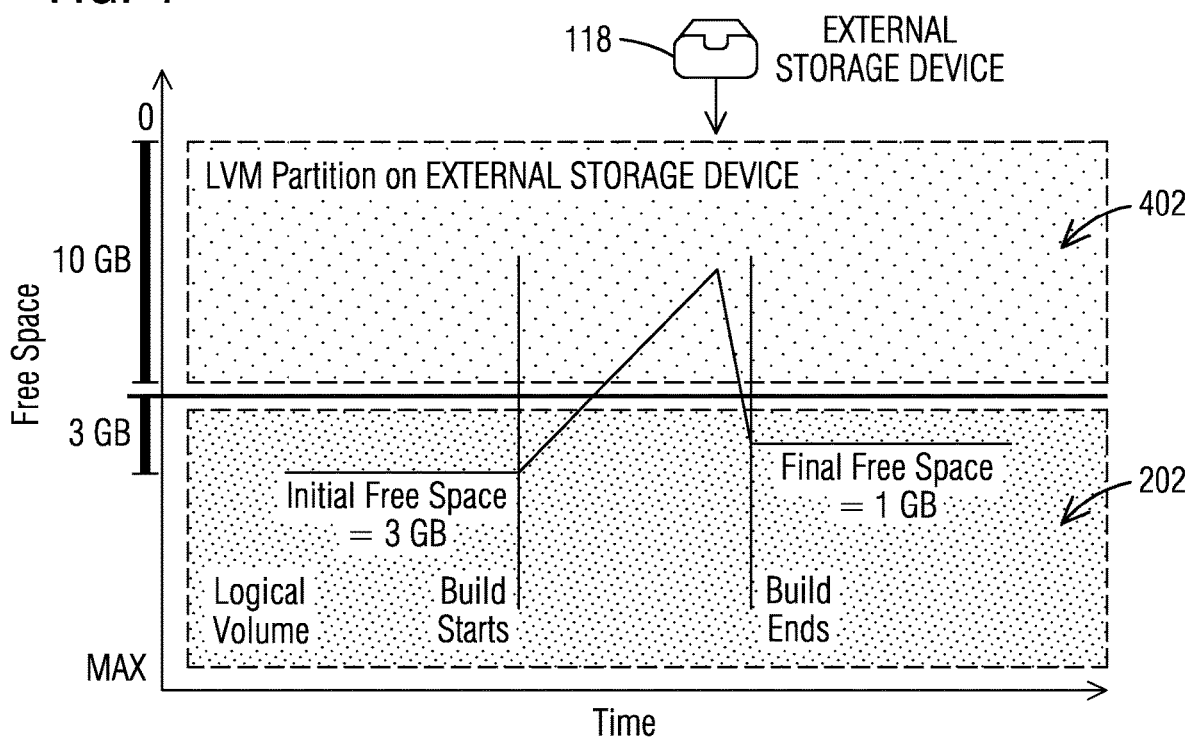
FIG. 4 is a schematic diagram illustrating an original state of a logical volume of the root filesystem.

FIG. 4 illustrates an original state prior to extending the logical volume, where the main logical volume 202 is logically separated from the LVM partition 402 of the external storage device 118. For the purpose of illustration, the configuration shown in FIG. 4 (and subsequently in FIG. 5-9) is overlaid on the example shown in FIG. 2. In the present example, the available free space in the main logical volume 202 is 3 GB. The size of the LVM partition 402 of the external storage device is 10 GB.

Continuing with reference to FIG. 3, the proposed software component may execute operational block 304 proceeding from the state shown in FIG. 4 as follows. On the target device, a new physical volume $PV_2$ is created for the LVM partition of external storage device. The existing virtual group VG is extended to include the newly created physical volume $PV_2$. Finally, the main logical volume LV is extended, and its filesystem is resized to account for the newly available space.

Figure 5:
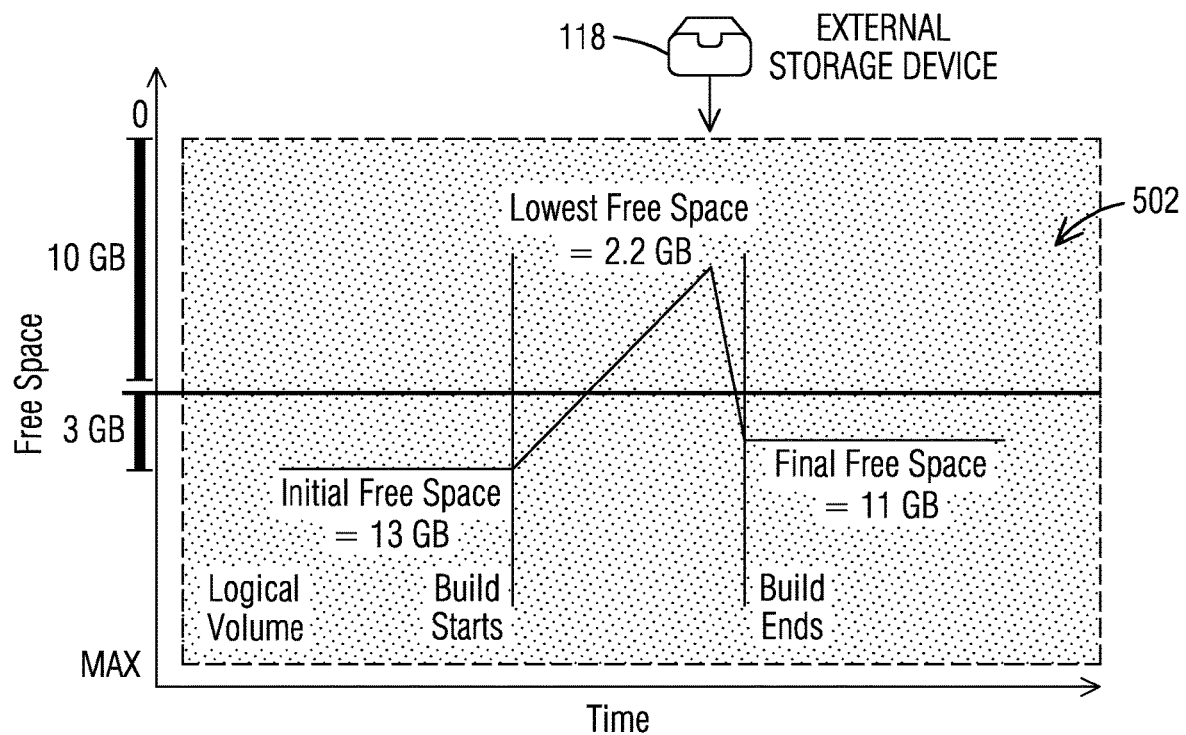
FIG. 5 is a schematic diagram illustrating an extended logical volume of the root filesystem utilizing the extended storage device.

The outcome of the above operation is shown in FIG. 5 where a seamlessly blended logical volume 502 with a unified filesystem is created through the integration between the target device internal storage medium and the external storage device. As shown, as a result of this operation, the main logical volume 502 and underlying filesystem now have enough space to satisfy the build requirements. In the present example, the logical volume is expanded by 10 GB (from the original state shown in FIG. 4), providing for the extra ~8 GB that was necessary to successfully complete the build process.

Still referring to FIG. 3, operational block 306 involves initiating, or as in case of the present example, re-initiating the application build process, where the extended logical volume is now utilized by the build process. The build process necessitates more space than that used by the final artifact resulting from the build process, as visible in FIG. 6.

Figure 6:
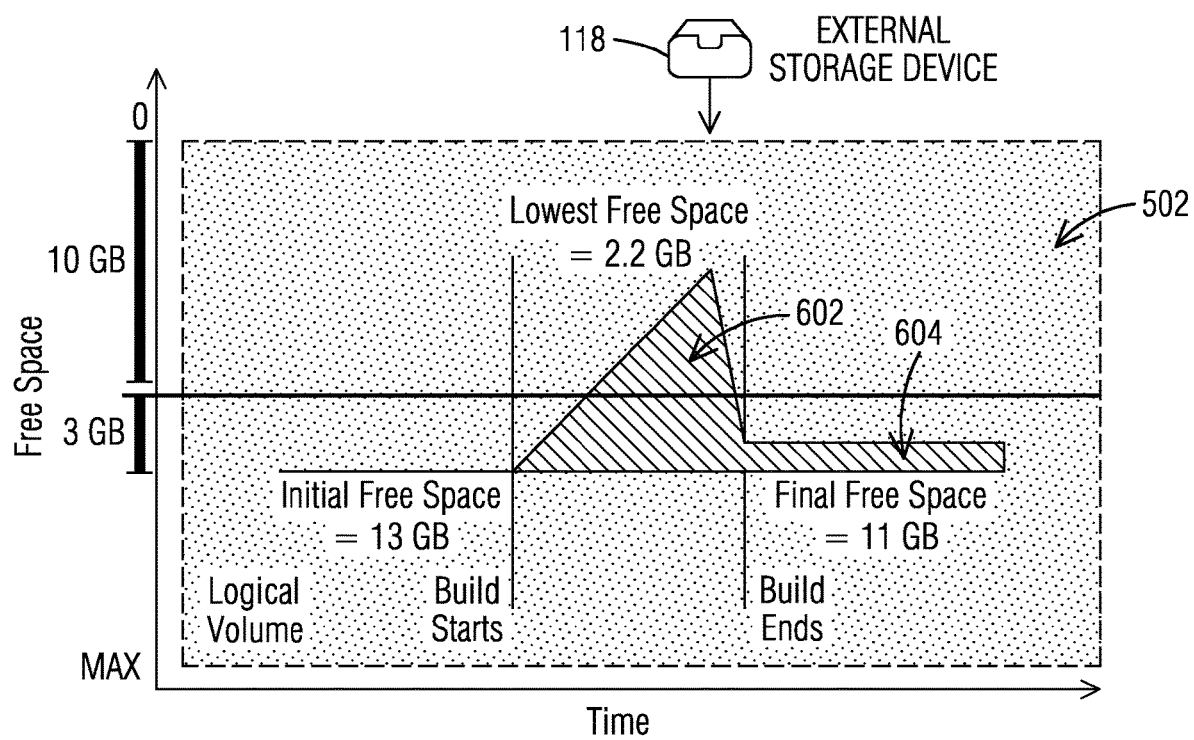
FIG. 6 is a schematic diagram illustrating space utilization as a function of time by the application build process in the extended logical volume.

Referring to FIG. 6, the space utilized by the build process (e.g, by the container engine) as a function of time is depicted by the region 602. The initial free space in the extended logical volume 502 is ~13 GB, which is entirely available for the build process. Space utilization by the container engine is optimal under these circumstances, given that a single unified filesystem exists that groups together the two physical devices. The space used by the final artifact resulting from the build process is depicted by the region 604 of constant size (memory space). As seen, the build process necessitates up to ~11 GB of disk space, whereas the final size of the artifact is only ~2 GB. Such a situation is especially encountered when building a virtualized application module. The image artifact resulting from the build process typically comprises the application and its dependencies (libraries, configuration files etc.), and in some cases, a guest operating system, all of which are bundled in an isolated user space instance, such as a container in this example.

Referring back to FIG. 3, operational block 308 involves shrinking the extended logical volume to its original state (prior to the extension) subsequent to the completion of the application build process. This allows the external storage device to be safely released or ejected from the target device. In some embodiments, such as in the illustrated example, the overall used space within the extended logical volume at the completion of the build process is less than the available free space in the internal storage medium. In this case, the shrink phase may further comprise transferring all data from a physical volume of the external storage device to a physical volume of the internal storage medium of the target device, to enable the external storage device to be released. This step is necessitated in many cases since data is often scattered in the extended logical volume at the completion of the build process.

The proposed software component may execute operational block 308, proceeding to from the state shown in FIG. 6, as follows. First, both the logical volume LV and the root filesystem are resized, i.e., shrunk to include only the physical volume $PV_1$ of the internal storage medium. Next, all data from the physical volume $PV_2$ belonging to the external storage device is moved to the physical volume $PV_1$ of the internal storage medium. Next, the virtual group VG is reduced to exclude the physical volume $PV_2$ of the external storage device. Finally, the external storage device physical volume $PV_2$ is removed from the target device.

Figure 7:
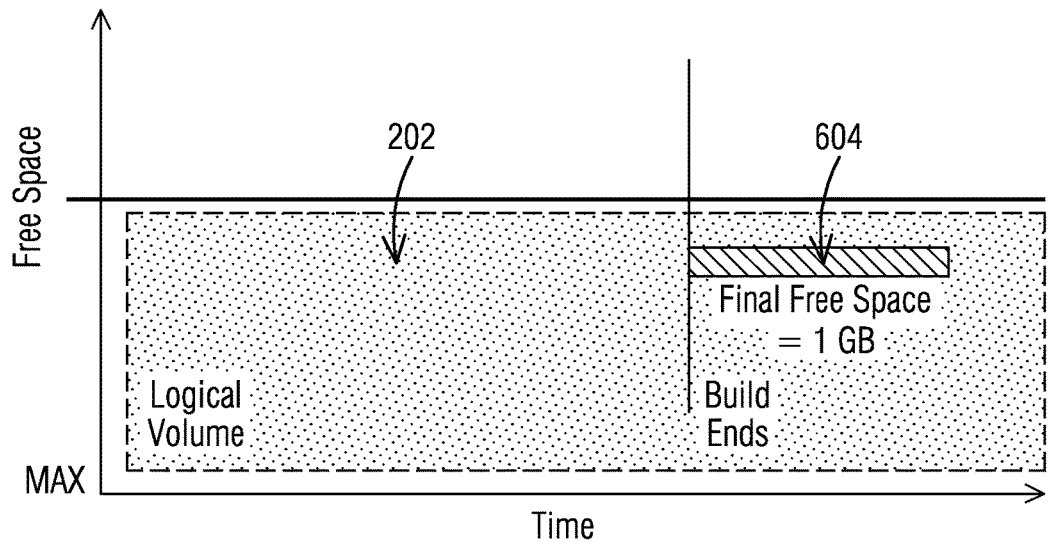
FIG. 7 is a schematic diagram illustrating space utilization by the final artifact of the application build process after shrinking the logical volume.

The outcome of the above operation is illustrated in FIG. 7. As shown, the main logical volume LV is restored to its previous state 202, with the image artifact being entirely located in this logical volume. Since the extra space needed by the build process is not needed anymore by the application to be executed on the target device, the external storage device is now released from the target device.

The above-described method may be substantially automatically executed by the proposed software component in the background while an application build process is in progress, with very little or no knowledge of the process to the user. For example, in some embodiments, a user interaction may be required only to connect an external storage device to the target device.

In a further embodiment, the shrink operation is not performed right away after the completion of the application build process, offering the possibility to retain the extended logical volume for an extended period of time, to host application data pertaining to the application image that is built. This embodiment, while also being directed to a problem of a temporary nature, differs from the previously described embodiment in that it is linked to the life-cycle of the application in the target device and not just the life-cycle of the application build process. This is particularly relevant in the context of many Edge applications that have a life-cycle of only a few days or weeks.

Figure 8:
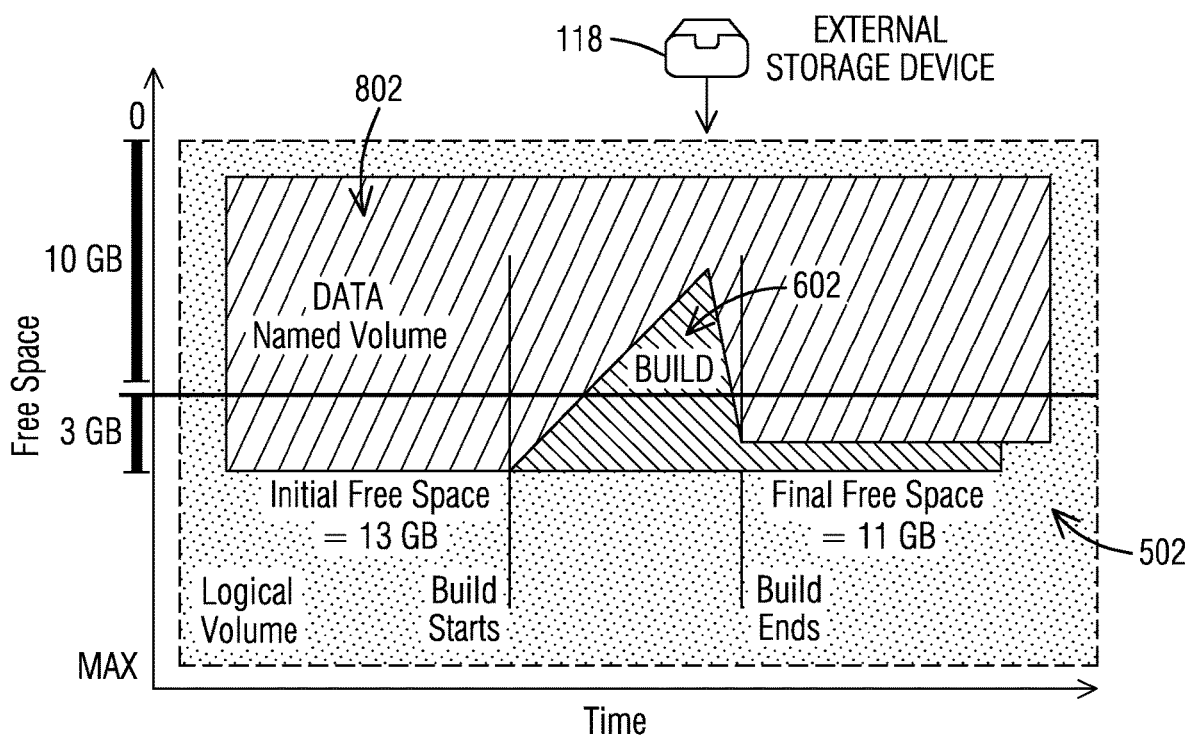
FIG. 8 is a schematic diagram illustrating dynamic allocation of space to store application data in the extended logical volume.

A first variant of the further embodiment is illustrated in FIG. 8. In this approach, in addition to using the extended logical volume for performing the build process, the proposed software component dynamically allocates an available free space in the extended volume for storing application data pertaining to the application image being built. As shown in FIG. 8, the build process dynamically uses a space 602 of the extended logical volume 502. The available free space 802 of the extended logical volume 502 may be dynamically offered to the application in the form of a container volume (Data Named Volume).

Figure 9:
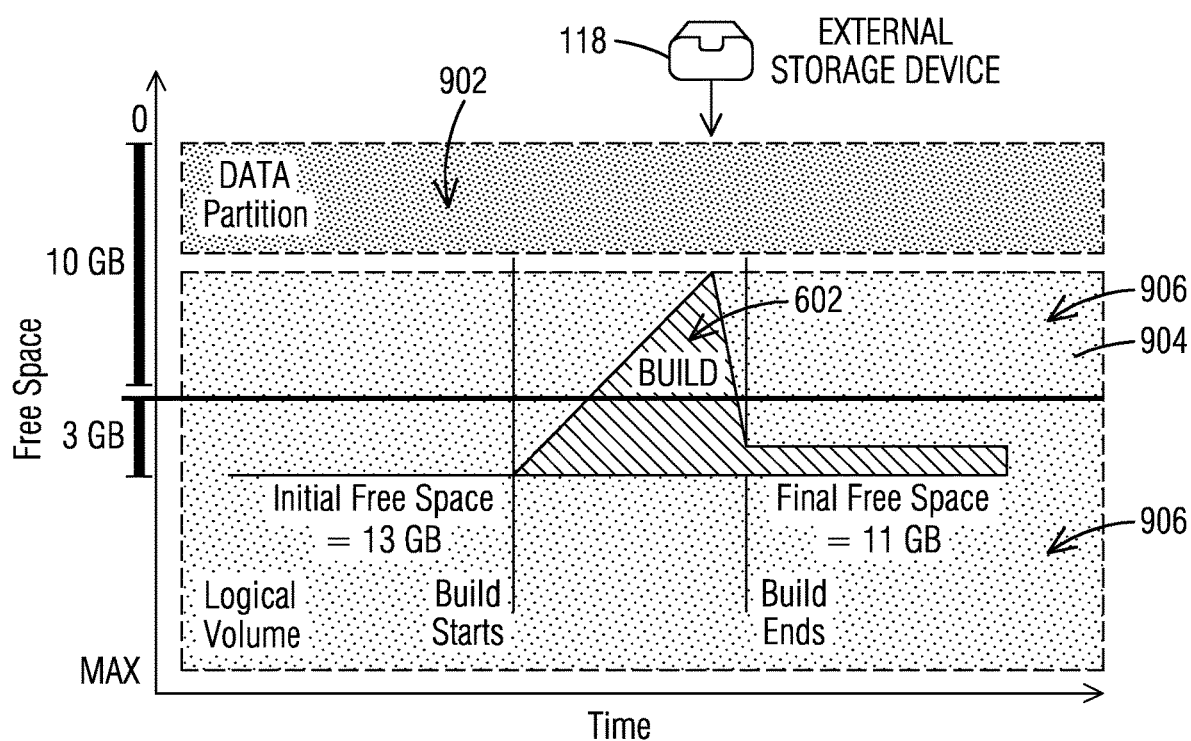
FIG. 9 is a schematic diagram illustrating static allocation of an external storage device partition to store application data.

A second variant of the further embodiment is illustrated in FIG. 9. In this approach, prior to extending the logical volume, a first partition 902 and a second partition 904 are created within the external storage device. The first partition 904 is statically allocated for storing application data pertaining to the application image being built. In this case, extending the logical volume of the target device is performed through integration between the internal storage medium and the second partition 904 of the external storage device. The extended logical volume in this case is depicted by the space 906. The operational steps are similar to what has been previously described with the exception that the physical volume $PV_2$ is now limited to the second partition 904 in the external storage device.

The embodiments of the present disclosure may be implemented with any combination of hardware and software. In addition, the embodiments of the present disclosure may be included in an article of manufacture (e.g., one or more computer program products) having, for example, a non-transitory computer-readable storage medium. The computer readable storage medium has embodied therein, for instance, computer readable program instructions for providing and facilitating the mechanisms of the embodiments of the present disclosure. The article of manufacture can be included as part of a computer system or sold separately.

The computer readable storage medium can include a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. Computer readable program instructions described herein can be downloaded to respective computing/processing devices from a computer readable storage medium or to an external computer or external storage device via a network, for example, the Internet, a local area network, a wide area network and/or a wireless network.

The system and processes of the figures are not exclusive. Other systems, processes and menus may be derived in accordance with the principles of the disclosure to accomplish the same objectives. Although this disclosure has been described with reference to particular embodiments, it is to be understood that the embodiments and variations shown and described herein are for illustration purposes only. Modifications to the current design may be implemented by those skilled in the art, without departing from the scope of the disclosure.

What is claimed is:

1. A computer-implemented method for building an application image on a target device of an industrial automation system, the target device comprising an internal storage medium organized into one or more logical volumes, the method comprising:
   identifying an external storage device connected to the target device,
   extending a first logical volume of the one or more logical volumes through integration between the internal storage medium and the external storage device, so as to define an extended logical volume,
   initiating a build process for building the application image, wherein the extended logical volume is utilized by the build process, wherein the build process necessitates more space than that used by a final artifact resulting from the build process, the final artifact defining the application image, and
   subsequent to the completion of the build process, shrinking the extended logical volume to the first logical volume, enabling release of the external storage device from the target device.

2. The method according to claim 1, wherein the first logical volume is a main logical volume initialized with a root filesystem, and wherein extending the first logical volume and shrinking the extended logical volume further comprise, in each case, resizing the root filesystem.

3. The method according to claim 1,
   identifying the external storage device after an "out of disk space" condition is reached during a previous execution of the build process to build the application image on the target device.

4. The method according to claim 3, comprising generating a prompt for a user to connect an external storage device to the target device when the "out of disk space" condition is reached.

5. The method according to claim 3, comprising automatically identifying an already connected external storage device when the "out of disk space" condition is reached.

6. The method according to claim 1, wherein an overall used space within the extended logical volume at the completion of the build process is less than a free space in the internal storage medium,
   wherein shrinking the extended logical volume further comprises transferring all data from a physical volume of the external storage device to a physical volume of the internal storage medium.

7. The method according to claim 1, comprising dynamically allocating an available free space in the extended logical volume for storing application data pertaining to the application image being built.

8. The method according to claim 1 comprising:
   prior to extending the first logical volume, creating a first partition and a second partition within the external storage device, and
   statically allocating the first partition of the external storage for storing application data pertaining to the application image being built,
   wherein extending the first logical volume is performed through integration between the internal storage medium and the second partition of the external storage device.

9. The method according to claim 1 wherein the application image is built as a virtualized application module in an isolated user space in the extended logical volume.

10. The method according to claim 1, wherein the application image is built as an Edge application module.

11. A non-transitory computer-readable storage medium including instructions that, when processed by a computer, configure the computer to perform the method according to claim 1.

12. A computing device of an industrial automation system comprising:
   a processor; and
   a memory comprising an internal storage medium organized into one or more logical volumes, the memory having stored thereon a software component to expand a capacity of the computing device to build an application image thereon, the software component, when executed by the processor, configures the computing device to:
      identify an external storage device connected to the computing device,
      extend a first logical volume of the one or more logical volumes through integration between the internal storage medium and the external storage device, so as to define an extended logical volume, initiate a build process for building the application image, wherein the extended logical volume is utilized by the build process, wherein the build process necessitates more space than that used by a final artifact resulting from the build process, the final artifact defining the application image, and subsequent to the completion of the build process, shrink the extended logical volume to the first logical volume, enabling release of the external storage device from the computing device.

13. The computing device according to claim 12, wherein the first logical volume is a main logical volume initialized with a root filesystem, and wherein the root filesystem is resized, in each case, by the extending of the first logical volume and the shrinking of the extended logical volume.

14. The computing device according to claim 12, wherein the software component, when executed by the processor, further configures the computing device to:

identify the external storage device after an "out of disk space" condition is reached during a previous execution of the build process to build the application image on the computing device.

15. The computing device according to claim 14, wherein the software component, when executed by the processor, further configures the computing device to:

generate a prompt for a user to connect an external storage device to the computing device when the "out of disk space" condition is reached.

16. The computing device according to claim 15, wherein the software component, when executed by the processor, further configures the computing device to:

automatically identify an already connected external storage device when the "out of disk space" condition is reached.

17. The computing device according to claim 12, wherein an overall used space within the extended logical volume at the completion of the build process is less than a free space in the internal storage medium, wherein shrinking the extended logical volume further comprises transferring all data from a physical volume of the external storage device to a physical volume of the internal storage medium.

18. The computing device according to claim 12, wherein the software component, when executed by the processor, further configures the computing device to:

dynamically allocate an available free space in the extended logical volume for storing application data pertaining to the application image being built.

19. The computing device according to claim 12, wherein the software component, when executed by the processor, further configures the computing device to:

prior to extending the first logical volume, create a first partition and a second partition within the external storage device, and statically allocate the first partition of the external storage device for storing application data pertaining to the application image being built, wherein extending the first logical volume is performed through integration between the internal storage medium and the second partition of the external storage device.

20. The computing device according to claim 12, comprising a virtualization software layer deployed on the memory, which is configured to build the application image as a virtualized application module in an isolated user space in the extended logical volume.

* * * * *